No. 733,635. Patented July 14, 1903.

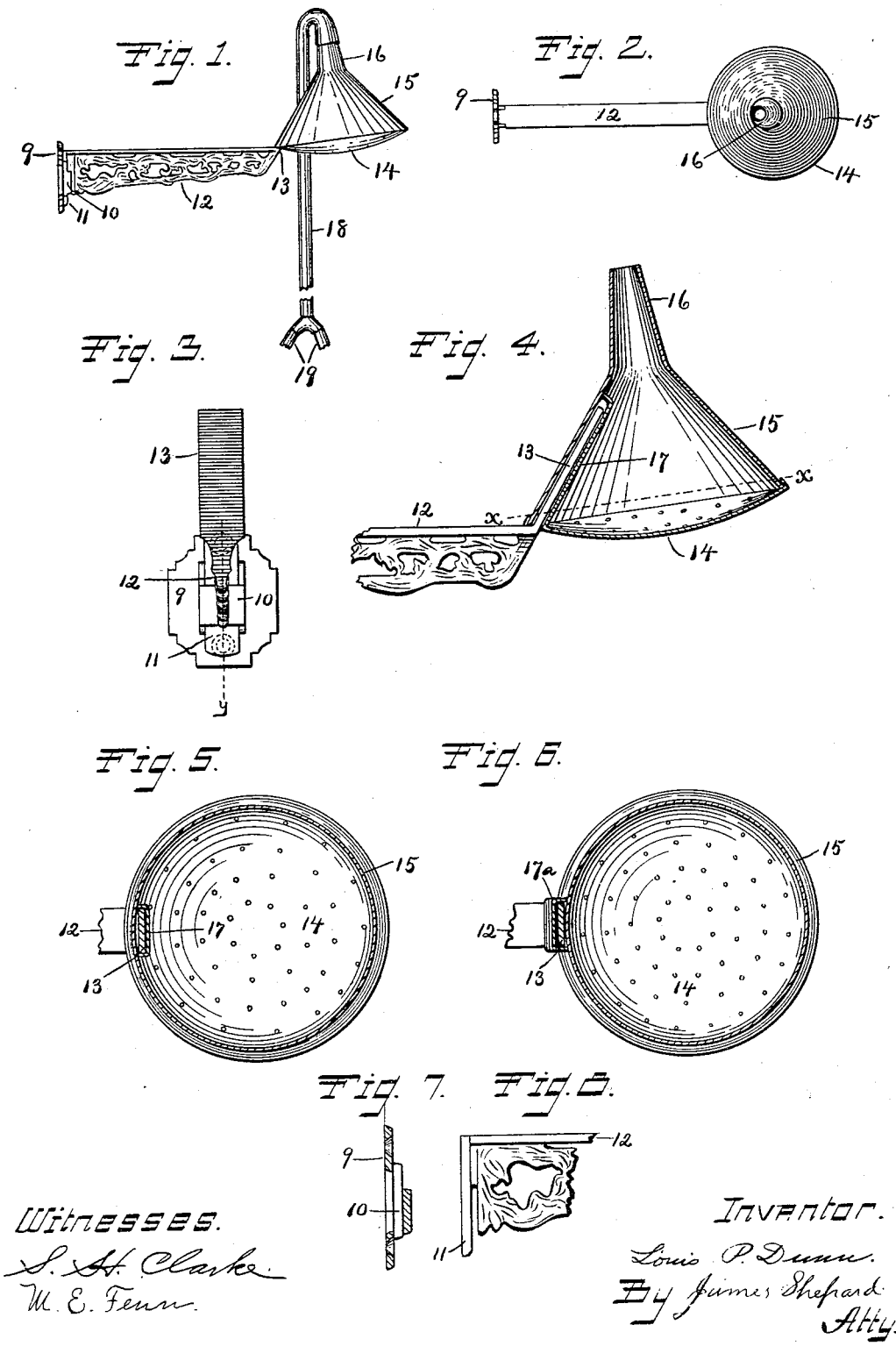

UNITED STATES PATENT OFFICE.

LOUIS P. DUNN, OF NEW BRITAIN, CONNECTICUT.

SHOWER-BATH APPARATUS.

SPECIFICATION forming part of Letters Patent No. 733,635, dated July 14, 1903.

Application filed November 12, 1902. Serial No. 130,982. (No model.)

*To all whom it may concern:*

Be it known that I, LOUIS P. DUNN, a citizen of the United States, residing at New Britain, in the county of Hartford and State of Connecticut, have invented certain new and useful Improvements in Shower-Bath Apparatus, of which the following is a specification.

My invention relates to improvements in shower-bath apparatus; and the main object of my improvement is to provide a cheap and simple apparatus for a shower-bath that may readily be attached to and detached from its support for use in any ordinary bath-room.

In the accompanying drawings, Figure 1 is a side elevation of my shower-bath apparatus. Fig. 2 is a plan view of the same with the rubber hose removed. Fig. 3 is an enlarged front elevation of the rose-supporting bracket. Fig. 4 is a central vertical section of the rose, together with a side elevation of the outer end of the supporting-bracket. Fig. 5 is a horizontal section of the same on the line $x\ x$ of Fig. 4. Fig. 6 is a like section of the same in a modified form. Fig. 7 is a vertical section of the base-plate for the bracket on the line $y$ of Fig. 3, and Fig. 8 is a side elevation of that end of the bracket which is designed to be received by the said base-plate.

The base-plate 9 is provided with a vertical socket 10, that is designed to receive and hold the tongue 11 of the supporting-bracket 12, so that the said bracket is readily attachable to and detachable from the said base-plate by slipping the tongue vertically down into the socket of the base-plate and lifting it out of the same. This base-plate is designed to be permanently secured to the wall of a bath-room in any desired position over a bath-tub, while the rest of the apparatus is detachable therefrom. The bracket 12 may be of any desired length and is provided at its outer end with an outwardly and upwardly inclined tenon 13.

The rose 14 has a flaring or funnel-shaped body 15 and a short tube or hose connection 16. The said flaring body of this rose is provided with a mortise or socket 17, the length of which extends upwardly from the face of the rose in a line parallel to the flaring sides of the said body and is as long or longer than the length of the tenon 13 of the supporting-bracket. The shape of this socket transversely is such as to receive and substantially fit the tenon 13. If the socket is inside of the flaring body, as shown in Figs. 1, 2, 4, and 5, its upper end should be closed, so as not to communicate with the interior of the rose. If desired, however, the socket 17ª may be on the outside of the rose-body, as shown in Fig. 6, in which case the upper end may be left open.

The apparatus may be arranged in any ordinary bath-room. After placing the supporting-bracket in position on the wall it is only necessary to slip the socket of the rose over the tenon 13 at the outer end of the bracket, so as to let the said tenon into the socket and support the rose, as shown. A piece of rubber or other hose 18 may be slipped on or otherwise connected with the hose connection 16, while the other end of the said hose may be connected with the water-supply. If the opposite end of the hose is branched, as shown at 19 in Fig. 1, it may be simultaneously connected to both the hot and cold water faucets, or if this end of the hose is single it may be connected to either the cold or hot water faucets, as may be desired, or if the bath-tub has a mixing-faucet it may be connected thereto.

The apparatus may be used without a curtain; but, if desired, a curtain can be readily suspended from the rose. When not wanted for use, the rose and bracket can both be readily removed, so as to be out of the way.

While I prefer to have the rose detachable from the bracket and the bracket detachable from its base-plate, the construction of the detachable rose and the rose-receiving end of the bracket would not be changed if the supporting-bracket were permanently secured in place.

I claim as my invention—

In a shower-bath apparatus, the combination of the bracket-arm having at its outer end the straight tenon 13, extending upwardly and outwardly on an incline, with the rose having the tapering body with a delivery at its lower end, the said body terminating at its upper end in a hose connection, and having the tenon-receiving socket extending upwardly from the delivery at the lower end of the said tapering body and parallel to the side of the said body.

LOUIS P. DUNN.

Witnesses:
M. E. DUNN,
JAMES SHEPARD.